United States Patent
Dubeyko

(10) Patent No.: US 10,678,446 B2
(45) Date of Patent: Jun. 9, 2020

(54) BITMAP PROCESSING FOR LOG-STRUCTURED DATA STORE

(71) Applicant: Western Digital Technologies, Inc., San Jose, CA (US)

(72) Inventor: Viacheslav Anatolyevich Dubeyko, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 18 days.

(21) Appl. No.: 15/647,108

(22) Filed: Jul. 11, 2017

(65) Prior Publication Data
US 2019/0018601 A1  Jan. 17, 2019

(51) Int. Cl.
*G06F 3/06* (2006.01)
*G06F 16/22* (2019.01)

(52) U.S. Cl.
CPC ............ *G06F 3/0619* (2013.01); *G06F 3/064* (2013.01); *G06F 3/065* (2013.01); *G06F 3/067* (2013.01); *G06F 3/0643* (2013.01); *G06F 16/2237* (2019.01)

(58) Field of Classification Search
None
See application file for complete search history.

(56) References Cited

U.S. PATENT DOCUMENTS

| | | | |
|---|---|---|---|
| 5,802,028 A | 9/1998 | Igarashi | |
| 8,103,821 B2 | 1/2012 | Chang et al. | |
| 9,229,854 B1 | 1/2016 | Kuzmin et al. | |
| 9,697,219 B1 * | 7/2017 | Wang | G06F 17/30144 |
| 9,785,366 B1 * | 10/2017 | Morley | G06F 3/0685 |
| 9,959,058 B1 * | 5/2018 | O'Brien | G06F 3/0616 |
| 2004/0054858 A1 * | 3/2004 | Chandrasekaran | G06F 3/0608 711/154 |
| 2004/0186946 A1 * | 9/2004 | Lee | G06F 3/0616 711/103 |
| 2004/0243736 A1 * | 12/2004 | Hattrup | G06F 3/0605 710/15 |
| 2009/0249001 A1 * | 10/2009 | Narayanan | G06F 1/3203 711/161 |
| 2010/0217952 A1 * | 8/2010 | Iyer | G06F 12/0897 711/209 |
| 2014/0089264 A1 * | 3/2014 | Talagala | G06F 3/065 707/649 |

(Continued)

OTHER PUBLICATIONS

Unknown Author "Log-Structured File Systems" dated 2014, 15 pages, htts:www.ostep.org, Arpaci-Dusseau.

*Primary Examiner* — Sean D Rossiter
*Assistant Examiner* — Stephanie Wu
(74) *Attorney, Agent, or Firm* — Patent Law Works LLP

(57) ABSTRACT

Novel technology for data object processing may include a system comprising a non-transitory memory; a non-transitory storage device; and a storage logic communicatively coupled to the non-transitory storage device and the non-transitory memory. The storage logic may be executable to perform operations comprising preparing a first log payload in the non-transitory memory; generating a first log bitmap describing a set of states for a set of logical blocks of an erase block of the non-transitory storage device; generating a first log including the first log bitmap and the first log payload; and storing the first log in the erase block of the non-transitory storage device.

20 Claims, 12 Drawing Sheets

(56) References Cited

U.S. PATENT DOCUMENTS

| | | |
|---|---|---|
| 2014/0089265 A1* | 3/2014 | Talagala ............ G06F 17/30551 |
| | | 707/674 |
| 2014/0095458 A1 | 4/2014 | Kim et al. |
| 2016/0019113 A1* | 1/2016 | Yano ................... G06F 11/1072 |
| | | 714/764 |
| 2016/0026408 A1 | 1/2016 | Peterson |
| 2016/0092309 A1 | 3/2016 | Gao et al. |
| 2016/0103860 A1* | 4/2016 | Bhattacharjee ... G06F 17/30309 |
| | | 707/607 |
| 2016/0147607 A1* | 5/2016 | Dornemann ........ G06F 11/1451 |
| | | 711/162 |
| 2016/0147614 A1* | 5/2016 | Mittal ................. G06F 11/1469 |
| | | 707/615 |
| 2016/0306738 A1* | 10/2016 | Bak ....................... G06F 12/023 |
| 2017/0131931 A1* | 5/2017 | Katori ................... G06F 3/0629 |

* cited by examiner

BITMAP PROCESSING FOR LOG-STRUCTURED DATA STORE

BACKGROUND

The present disclosure relates to bitmap processing for log-structured data file stores.

Non-log-structured storage management systems, such as those used in association with hard disk and/or solid state drives, can prepare and send write requests to the drives. In some cases, such file systems can identify which blocks are free or allocated, determine in which blocks to write new data using bitmaps, and/or update data using an extents tree, for example, that informs the system about the logical block address (LBA) associated with the data.

FIG. 3A is a diagram of an example bitmap 300 according to prior solutions. As shown, the bitmap uses a single bit to flag whether a given block in a data volume is free or used. Such bitmaps can provide adequate performance for various hard disk and solid state drive-based file systems (e.g., ext4, xfs, etc.), but have significant drawbacks in other types of file systems, such as log-structured file systems (LFSs) (e.g., F2FS, NILFS2, etc.) because they are unable to accommodate copy-on-write policies. For instance, in such log-structured file systems, if a data update needs to be performed, a new segment in a new physical location generally needs to be prepared for writing the data, which the above-described prior solutions are unable to efficiently accommodate.

Further, current LFSs generally do not use bitmaps in the above, historical manner to track logical blocks, because they are unable to account for additional states (e.g., pre-allocated, valid/invalid, etc.), and cannot be used to track a block's lifecycle inside an LFS volume. For instance, in the case of an erase block failure in an LFS, the above bitmap-based approach is unable to flag and overcome such failures. Instead, LFSs use alternative tracking approaches (e.g., dedicated tables, etc.) that increase overhead and exhibit lower performance.

SUMMARY

The present disclosure relates to bitmap processing for log-structured data stores. According to one innovative aspect of the subject matter in this disclosure, a system comprises: a non-transitory memory, a non-transitory storage device, and a storage logic. The storage logic is communicatively coupled to the non-transitory storage device and the non-transitory memory, and is executable to perform operations comprising: preparing a first log payload in the non-transitory memory; generating a first log bitmap describing a set of states for a set of logical blocks of an erase block of the non-transitory storage device; generating a first log including the first log bitmap and the first log payload; and storing the first log in the erase block of the non-transitory storage device.

In another innovative aspect, a method comprises: preparing a first log payload in a non-transitory memory; generating a first log bitmap describing a set of states for a set of logical blocks of an erase block of a non-transitory storage device; generating a first log including the first log bitmap and the first log payload; and storing the first log in the erase block of the non-transitory storage device.

These and other implementations may optionally include one or more of the following features, such as, but not limited to: that the log bitmap represents each state of the set of states using at least two bits; that each state is one of a free state, a pre-allocated state, a valid state, and an invalid state; the storage logic comprises at least a portion of a log-structured file system; receiving a first sequence of write requests; generating the first log responsive to the first sequence of write requests being received; receiving a second sequence of write requests; determining that a sufficient number of clean pages are available in the erase block to accommodate a second log for the second sequence; generating a second log including a second log payload and a second log bitmap; storing the second log in the erase block; that generating the first log bitmap includes marking a state of a particular logical block of the set of logical blocks of the erase block as pre-allocated; that generating the second log includes generating the second log bitmap that marks the state of the particular logical block as valid; that the first bitmap is associated with a first timestamp and the second bitmap is associated with a second timestamp that is later than the first timestamp; determining that a second metadata portion of the second log storing the second log bitmap is corrupt; retrieving the first log bitmap from a first metadata portion of the first log; executing a data rollback operation using the first log bitmap; that the first log bitmap marks two or more logical blocks of the set of logical blocks are pre-allocated; that the two or more logical blocks are compressed logical blocks; that the two or more logical blocks are stored in a same physical page of the erase block; that the first log includes a metadata portion storing the first log bitmap, a counter of physical pages in the first log, and a counter of metadata pages in the first log.

The technology disclosed herein provides a number of advantages and benefits over prior solutions, including, but not limited to, providing compact and highly efficient metadata structure for tracking valid/invalid logical blocks by garbage collection and other systems or subsystems of a log-structured file systems (LFS), provide for a more efficient GC policy in LFSs, tracking the whole lifecycle of a logical block inside of an erase block or segment, and accessing and modifying different log bitmaps concurrently from different erase blocks or segments.

It should be understood, however, that the above list of features is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
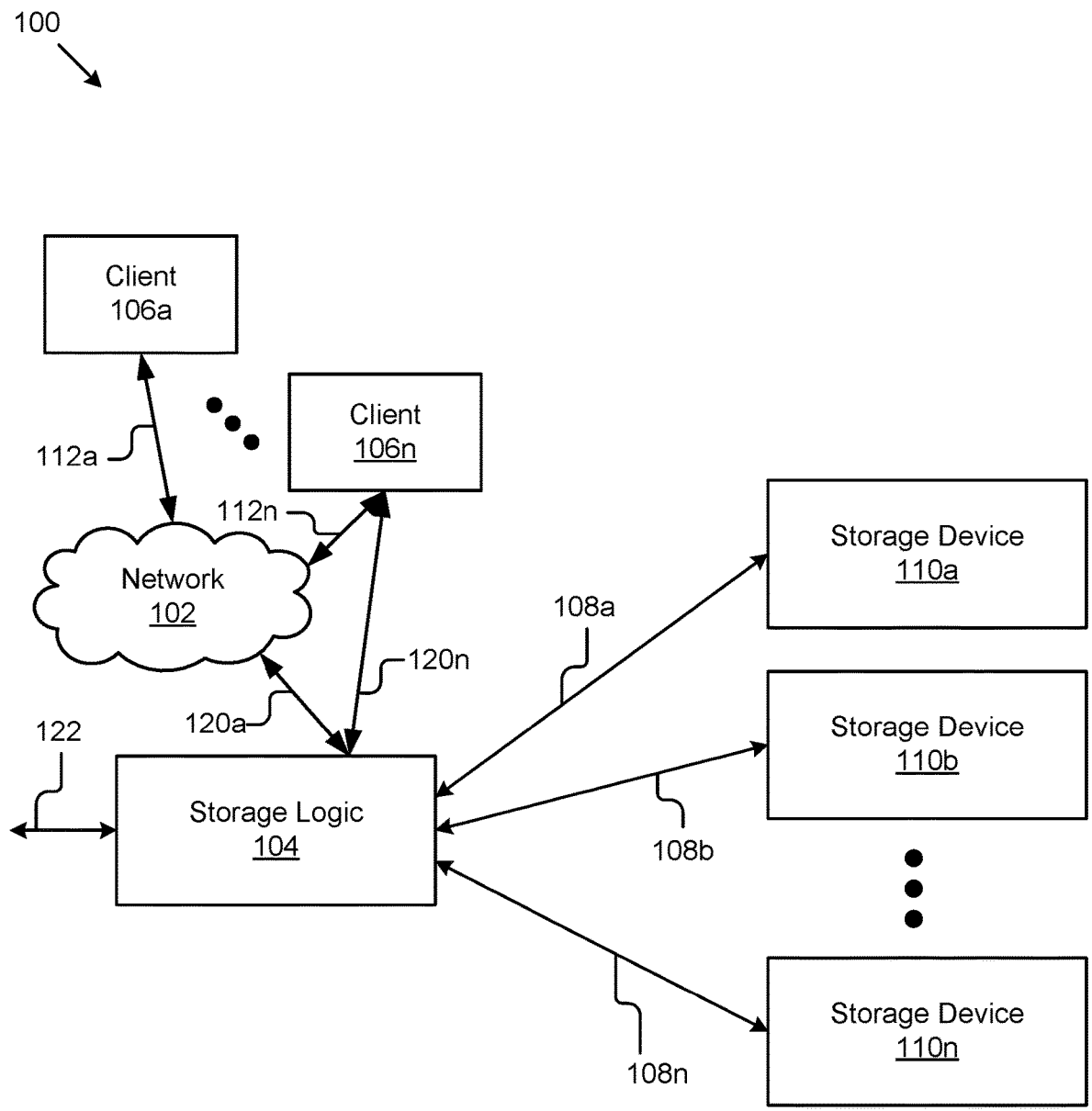
FIG. 1 is a block diagram of an example system for bitmap processing in log-structured file systems.

The innovative technology disclosed herein includes various aspects, such as systems, methods, apparatuses, computer-readable media, computer program products, etc., for log-structured file systems. While various systems, methods, and other aspects are described in the context of particular system architectures, it should be understood that these aspects can be applied to other architectures and organizations of hardware.

In the below description, some or all of the following terminology may apply. A data object includes a set of data. A segment includes a portion of space allocated to storing data. A segment may be comprised of one or more erase blocks. Non-limiting examples erase blocks, in the case of an SSD, are a physical erase block (PEB), a logical erase block (LEB), etc. A block includes a plurality of pages, with each page having a pre-configured size.

In some LFS embodiments, the actual structure of the storage device (e.g., SSD) may be abstracted to the operating system. Generally, such a file system can manipulate LEBs, whereas the non-transitory storage device (e.g., an SSD's flash translation layer (FTL)) may manipulate the corresponding PEBs. The FTL may obscure the PEBs associated with the LEBs from file system, and provides the file system the ability to read/write physical sectors using LBAs. In some cases, PEBs may be exposed to file system (e.g., an open-channel SSD approach), although access to bad PEBs may still be managed internally by the non-transitory storage device. In some cases, some flash-oriented file systems (JFFS2, YAFFS, UBIFS, and so on) have access to PEBs. Examples of such systems include, but are not limited to, embedded devices that have a certain amount of NAND flash (e.g., system-on-a-chip (SOC)).

Each page of an erase block may contain one or more logical blocks (also called chunks). A non-limiting example logical block includes an addressable logical block (LBA). As discussed further herein, the technology can determine the states of the logical blocks included in a payload of a log using a log bitmap, which provides numerous advantages over prior solutions.

As a non-limiting example, an LEB and corresponding PEB may contain a certain number of logical blocks. For example, an 8 MB PEB may contain 2048 logical blocks of 4 KB each, where a log bitmap according to example embodiments described herein has a size of 512 B in size because it includes 2 bits for every logical block in the PEB/LEB. In this example, assume that each log is 128 KB in size and contains a 512 B bitmap that describes the states of logical blocks for the PEB/LEB. Also assume that the PEB/LEB contains 64 logs. As a result, the payload of one log may contain some subset of the whole logical blocks array of the PEB/LEB because 128 KB log cannot store more than 32 logical blocks of 4 KB in size, although other variations are also possible and contemplated, such as those using any suitable sizes depending the requirements or parameters of the implementation.

As a further non-limiting example, for an 8 MB PEB, where the log bitmap describes the state of logical blocks for the whole PEB, assume that every log (128 KB in size each) can store 30 logical blocks (4 KB in size each) because 4 KB is used for the header and 4 KB is used for footer of the log. If 32 logs are stored into the PEB/LEB, then 960 logical blocks were used and 960 logical blocks are free. In a subsequent operation where an additional amount of logical blocks are being added into the PEB/LEB (e.g., 60 logical blocks), then the most current bitmap is checked. In some cases, if the bitmap is not available in memory, then the bitmap from the (most recently/last log) of the PEB/LEB is read and used to identify the free logical blocks. In this example, since each log can store 30 logical blocks, two logs are created to add the 60 logical blocks and added into the tail of PEB's/LEB's logs sequence.

In different implementations, a segment may be called different names. For example in an SSD, a segment may refer to a physical erase block (PEB) or a collection of erase blocks (PEBs). In a hard disk drive (HDD), a segment may refer to a disk track or collection of adjacent sectors. Segment addresses may have physical addresses and segments may be subjected to garbage collection (GC) in some cases. Garbage collection is generally a form of automatic data storage management. Garbage collection may periodically attempt to reclaim portions of the storage system occupied by data that is no longer needed (e.g. moved or deleted data). Garbage collection may be employed on contiguous ranges of locations within a storage media.

FIG. 1 is a block diagram of an example system 100 for bitmap processing in a log-structured file system. In the depicted embodiment, the system 100 may include client devices 106a . . . 106n (also referred to herein simply as 106 for convenience), a storage logic 104, and storage device(s) 110a, 110b, . . . 110n (also referred to herein simply as 110 for convenience). The storage logic 104 and the one or more storage devices 110a, 110b, . . . , 110n are communicatively coupled via signal lines 108a, 108b, . . . , 108n (also referred to herein simply as 108 for convenience). In some embodiments, the storage logic 104 may embody host file system logic configured to provide LFS functionality. In some embodiments, the storage logic 104 may embody local controller logic, such as disk drive logic (e.g., SSD controller logic (e.g., flash translation layer, etc.), storage rack controller logic, other applicable logic, etc. Other suitable variations are also possible and contemplated.

One or more of the system 100 components may be coupled via the network 102. For example, as shown, one or more client devices 106 (e.g., client device 106a) may be coupled to the network 102 for communication with storage-device(s) 110 via storage logic 104. In further examples, one or more client devices 106 may be coupled via signal line 112a to the storage logic 104 via other communication mechanisms, such as a communication bus or other wired or wireless connections and/or hardware. While a single instance of the storage logic 104 is shown, it should be understood that any number of storage logic 104 instances may be included. For instance, in an example installation, a plurality of storage logic 104 instances could be included and executable to provide the innovative advantages and benefits discussed herein.

In some embodiments, the entities of the system 100 may use and/or comprise a cloud-based architecture where one or more computer functions or routines are performed by remote computing systems and devices at the request of a local computing device. For example, a client device 106 can be a computing system having hardware and/or software resources, and may access hardware and/or software resources provided across the network 102 by other computing systems and resources, including, for instance, other client devices 106, storage logic 104 instances, computing systems including storage logic 104 instances (e.g., included in servers, appliances, etc.), storage device(s) 110, or any other entities of the system 100.

It should be noted that the terms storage node, storage media, and storage device are used interchangeably throughout the present disclosure to refer to the physical media upon which the data is stored. Further, in the illustrated embodiment, the storage logic 104 may be further communicatively connected to via signal line 122 to other system 100 elements, such as external systems (not shown), etc.

It should be understood that the system 100 is not limited to this configuration, and a variety of different system environments and configurations may be employed and are within the scope of the present disclosure. Other embodiments may include additional or fewer computing devices, services and/or networks.

The network 102 can be a conventional type, wired or wireless, and may have numerous different configurations including a star configuration, token ring configuration, or other configurations. Furthermore, the network 102 may include a local area network (LAN), a wide area network (WAN) (e.g., the internet), and/or other interconnected data paths across which multiple devices (e.g., storage logic 104, client device 106, etc.) may communicate. In some embodiments, the network 102 may be a peer-to-peer network. The network 102 may also be coupled with or include portions of a telecommunications network for sending data using a variety of different communication protocols.

For example, data may be transmitted via the network 102 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols. Although the example of FIG. 1 illustrates one network 102, in practice one or more networks 102 can connect the entities of the system 100.

The storage logic 104 can implement log-based store-related operations in association with storage devices 110. In some embodiments, the storage logic 104 and the storage device(s) 110 may embody a type of log-structured file system (LFS) or portion thereof. In some embodiments, the storage logic 104 can generate log bitmaps, identify bitmaps and associated states, aggregate bitmaps as a segment bitmap, change bitmap states, provide for corrupted bitmap recovery, and manage data storage and garbage collection, as discussed elsewhere herein.

The storage logic 104 is coupled to the storage devices 110 via signal lines 108 for communication and cooperation with the storage devices 110 of the storage system 100. In some embodiments, the storage logic 104 transmits data between the storage devices 110 via the signal lines 108.

The storage logic 104 may be further communicatively connected to via signal line 122 to other system 100 elements, such as external systems. For example, the signal line 122 may represent a computer bus or other communication mechanism. It should be recognized that the storage logic 104 block may represent a distributed architecture or otherwise include multiple storage logic 104 elements. For instance, the storage logic 104 can provide computing functionalities, services, and/or resources to send, receive, read, write, and transform data from other entities of system 100. For simplicity and ease of understanding, the system configuration and operations performed by the storage system 100 are described in the context of a single storage logic 104, although the storage logic 104 may comprise a collection of elements in some cases.

In some embodiments, the client devices 106 include computing systems having data processing and data communication capabilities. In the illustrated embodiment, the client devices 106a . . . 106n are communicatively coupled to the network 102 via signal lines 112a . . . 112n respectively. In some instances, the storage logic 104 may be coupled to a client device 106a via signal lines 112a and 120a. In some instances, the storage logic 104 and the client device 106n may be more directly coupled, as show via signal line 120n. Other variations are also possible and contemplated.

The client devices 106 can be any type of computing system including one or more memories and one or more processors, for example, a laptop computer, a desktop computer, a tablet computer, a mobile telephone, a server device, a server appliance, a personal digital assistant (PDA), a mobile email device, a portable game player, a portable music player, a television with one or more processors embedded therein or coupled thereto or any other electronic device capable of making storage requests. A client device 106 may execute an application that makes storage requests (e.g., read, write, etc.) to the storage logic 104. While not shown, client devices 106 may be directly coupled with the storage devices 110 in some embodiments.

The client device 106 may also include one or more of a graphics processor; a high-resolution touchscreen; a physical keyboard; forward and rear facing cameras; a Bluetooth® module; memory storing applicable firmware; and/or various physical connection interfaces (e.g., USB, HDMI, headset jack, etc.); etc. Additionally, an operating system for managing the hardware and resources of the client device 106, application programming interfaces (APIs) for providing applications access to the hardware and resources, a user interface module (not shown) for generating and displaying interfaces for user interaction and input, and applications including, for example, applications for manipulating documents, images, e-mail(s), and applications for web browsing, etc., may be stored and operable on the client device 106. The system 100 may include any number of client devices 106.

Furthermore, the client devices 106 and storage logic 104 of system 100 can include additional components, which are not shown in FIG. 1 to simplify the drawing. Also, in some embodiments, not all of the components shown may be present. Further, the various controllers, blocks, and interfaces can be implemented in any suitable fashion. For example, a storage logic 104 can take the form of one or more of, for example, a microprocessor or processor and a computer-readable medium that stores computer-readable program code (e.g., software or firmware) executable by the (micro)processor, logic gates, switches, an application specific integrated circuit (ASIC), a programmable logic controller, an embedded microcontroller, etc., as discussed elsewhere herein.

The storage devices 110 include non-transitory computer-usable (e.g., readable, writeable, etc.) media, which can be any non-transitory apparatus or devices that can contain, store, communicate, propagate or transport instructions, data, computer programs, software, code routines, etc., for processing by or in connection with a processor. While, in various embodiments, the storage devices 110 are described as including solid state memory (e.g., NAND flash), it should be understood that in some embodiments, the storage devices 110 may include other non-volatile memory devices with suitable characteristics, HDDs, hybrid storage devices, etc. Further example storage devices may include a dynamic random access memory (DRAM) device, a static random access memory (SRAM) device, magnetic tape, optical disk-based storage, or some other non-volatile storage device.

In some cases, storage logic 104 and, the storage device(s) 110 may be integrated into a single storage device. In further cases, storage logic 104 may be implemented as a controller, such as a RAID controller, and storage devices 110 may include multiple devices connected to the controller. In some cases, a storage system 100 may be a distributed storage system spanning several geographic regions. For instance, the storage logic 104 may include an Application Programming Interface (API) implemented on one or more server nodes in the distributed storage system 100. Thus, control line 122 may reflect a transport protocol operating over Internet Protocol (IP). In such an example, the storage device(s) 110 may include several other server nodes spread across several geographic regions, and control lines 126 may also include a transfer protocol operating over IP.

Figure 2:
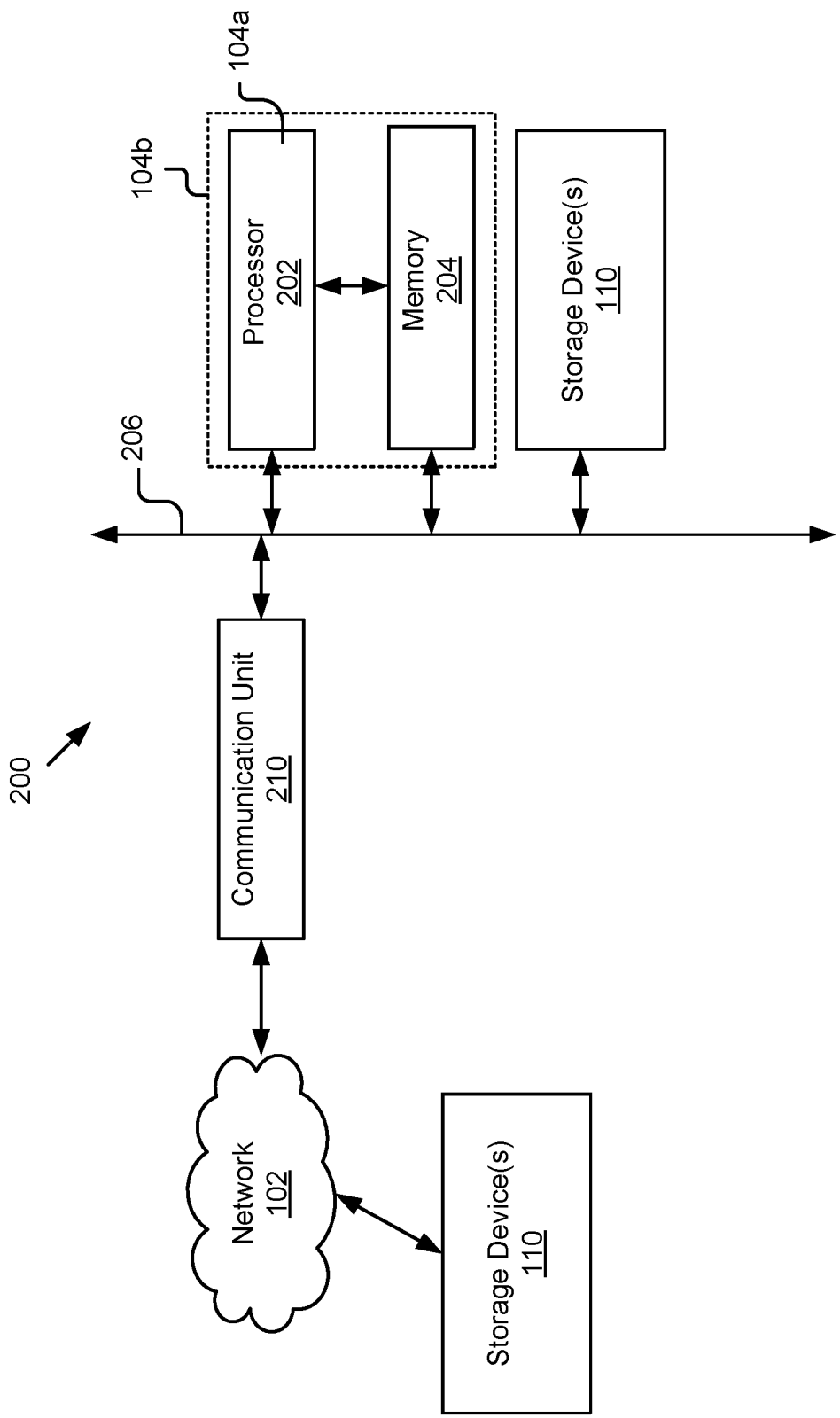
FIG. 2 is a block diagram of example storage logic.

FIG. 2 is a block diagram of example the computing system 200 comprising the storage logic 104. The computing system 200 may include storage logic 104, which may be electronically communicatively coupled by a communication bus 206 for cooperation and communication with other components of the computing system 200 and/or system 100.

The storage logic 104 may be implemented in hardware and/or software. In some embodiments, the storage logic 104 may include a processor 202 and a memory 204 that are configured to perform the operations described herein, as shown by 104b. For instance, the storage logic 104 may include specially configured software stored in the memory 204 and executable by the processor 202 so as to configure the processor 202. In some embodiments, the storage logic 104 may include logic gates, switches, application specific integrated circuitry (ASIC), a programmable logic controller, an embedded microcontroller, and/or other suitable hardware, etc., as shown by 104a. In further embodiments, the storage logic 104 may include both hardware and software aspects. Numerous other variations are also possible and contemplated.

The processor 202 may include one or more arithmetic logic units, microprocessors, general-purpose controllers, or some other processor arrays to perform computations and provide electronic display signals to a display device. In some embodiments, the processor 202 includes a hardware processor having one or more processing cores. The processor 202 is coupled to the bus 206 for communication with the other components. Processor 202 processes data signals and may include various computing architectures including a complex instruction set computer (CISC) architecture, a reduced instruction set computer (RISC) architecture, or an architecture implementing a combination of instruction sets. Although only a single block is show for the processor 202 in the example of FIG. 2, multiple processors and/or processing cores may comprise the processor 202. It should be understood that other processor configurations are possible.

The memory 204 may store instructions and/or data that may be executed by a customized processor (e.g., the processor 202). The memory 204 is coupled to a bus (not shown) for communication with the other components of the storage logic 104. The instructions and/or data stored in the memory 204 may include code for performing the techniques described herein. The memory 204 may be, for example, non-transitory memory, such as a dynamic random access memory (DRAM) device, a static random access memory (SRAM) device, or another volatile memory device.

The memory 204 may include one or more non-transitory computer-usable (e.g., readable, writeable, etc.) media, which can include any non-transitory apparatus or device that can contain, store, communicate, propagate or transport instructions, data, computer programs, software, code, routines, etc., for processing by or in connection with the processor 202. In some embodiments, the memory 204 may include a non-transitory memory such as a dynamic random access memory (DRAM) device, a static random access memory (SRAM) device, flash memory, or some other volatile or non-volatile memory devices.

The bus 206 may include a communication bus for transferring data between components of a computing device or between computing devices, a network bus system including the network 102 or portions thereof, a processor mesh, a combination thereof, etc. In some embodiments, the client devices 106 and the storage logic 104 may cooperate and communicate via a software communication mechanism implemented in association with the bus 206. The software communication mechanism may include and/or facilitate, for example, inter-process communication, local function or procedure calls, remote procedure calls, network-based communication, secure communication, etc.

The communication unit 210 may include one or more interface devices for wired and wireless connectivity with the network 102 and the other entities and/or components of the system 100 including, for example, the client devices 106, servers, data storage devices 110, etc. For instance, the communication unit 210 may include, but is not limited to, CAT-type interfaces; wireless transceivers for sending and receiving signals using Wi-Fi™; Bluetooth®, cellular communications, etc.; USB interfaces; various combinations thereof; etc. In some embodiments, the communication unit 210 can link the processor 202 to the network 102, which may in turn be coupled to other processing systems. The communication unit 210 can provide other connections to the network 102 and to other entities of the system 100 using various standard communication protocols, including, for example, those discussed elsewhere, herein.

Figure 3A:
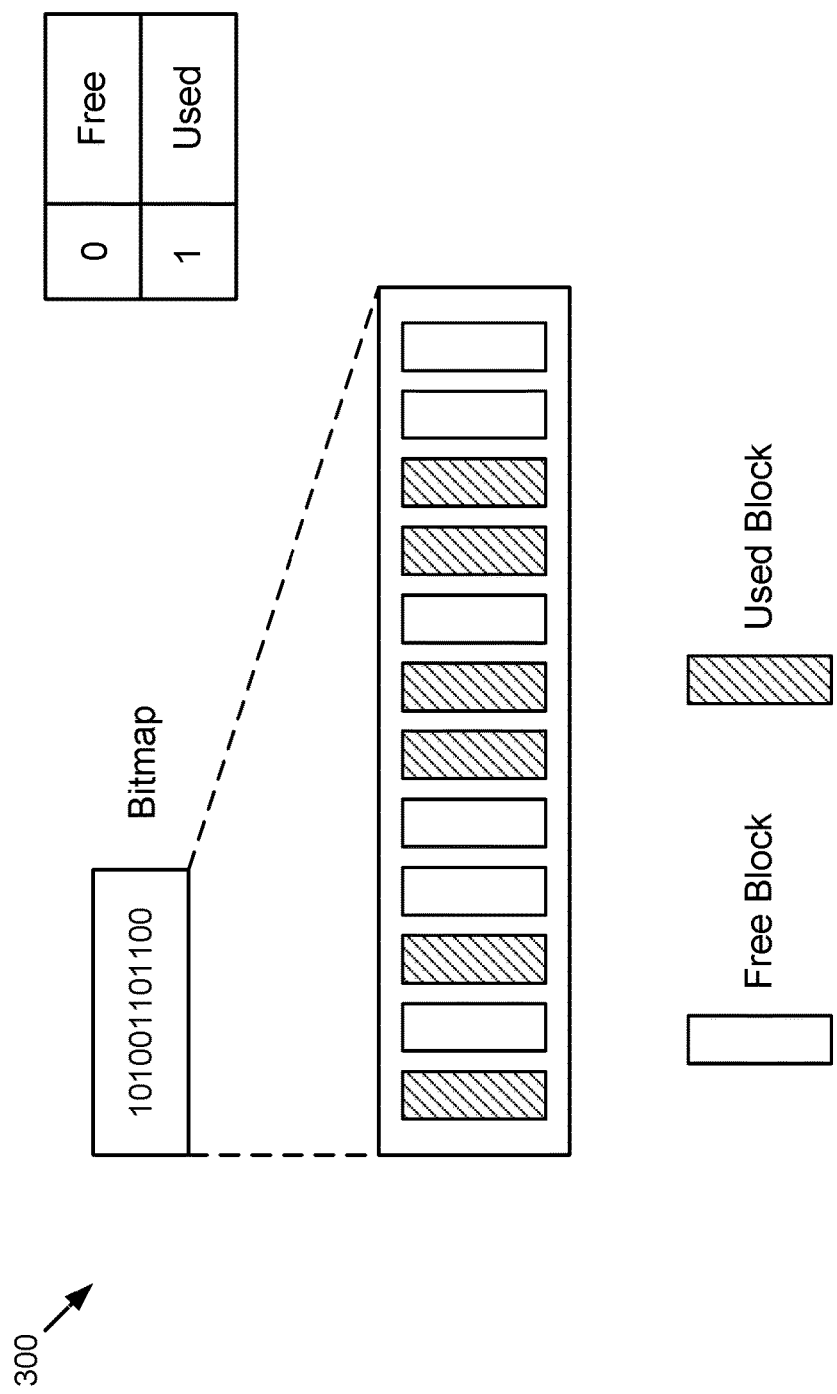
FIG. 3A is a diagram of an example bitmap according to prior solutions.
Figure 3B:
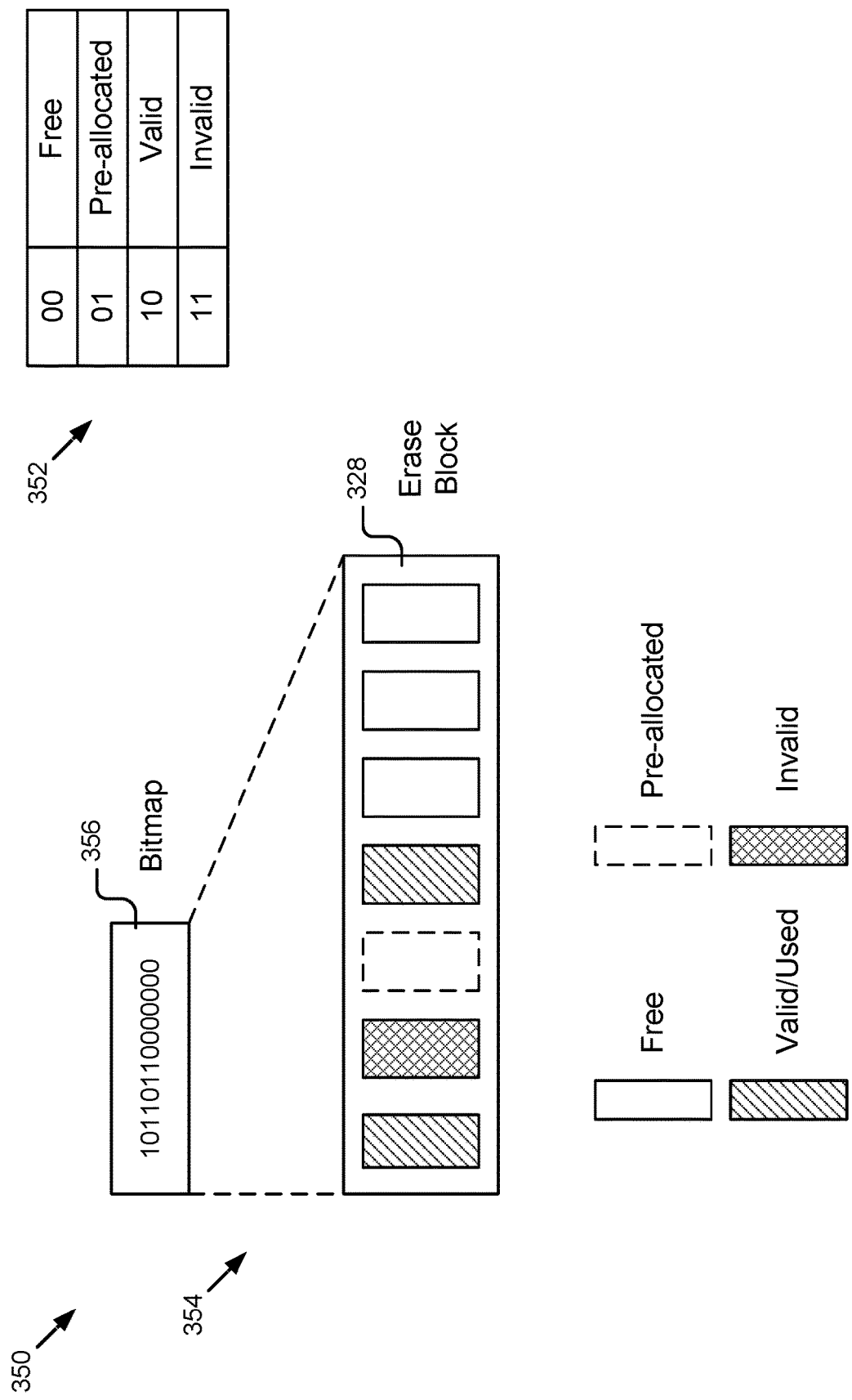
FIG. 3B is a diagram of an example improved bitmap.

In comparison to FIG. 3A, the log bitmap 350 (also simply referred to as a bitmap) in FIG. 3B is capable of identifying more than two states of a given logical block included in a log payload. The log bitmap 350 may include a data structure capable of identifying several different states that can occur (e.g., three, four, or more different states, etc.). The log bitmap 350 can advantageously account for additional characteristics of the payload logical blocks, unlike the prior solutions described in the Background. In the depicted embodiment, bits are used to identify the logical states of the logical blocks, although it should be understood that the bitmap may have other forms and the bits, as used herein, may cover other suitable data types capable of flagging three or more states.

In the depicted example, in the legend 352, the bits 00 reflect that the logical block is free, the bits 01 reflect that the logical block is pre-allocated, the bits 10 reflect that the logical block is valid, and the bits 11 reflect that the logical block is invalid, although it should be understood that the foregoing mapping is provided by way of illustration, and the states may be mapped to different bit sequences and/or other data types. Further additional or fewer states may be mapped depending on need.

In the depicted example, a free state reflects that the logical block, or the physical page that contains it, is clean/unwritten (e.g., data has not yet been written to the logical block/page, and the logical block/page does not necessarily require erasure or garbage collection in order to be written to). A pre-allocated state reflects that the logical block has been designated to be filled. In some instances, the state of a logical block may be set to pre-allocated during compression of data to be stored in the logical blocks, although other suitable uses are also possible and contemplated. An invalid state reflects that the logical block was updated and the new state was written into another PEB/LEB. For example invalid state may reflect that the data of logical block has been/is being moved (e.g., from one physical page to another physical page), etc. A valid state reflects that the logical block contains the actual state of data.

As a further example, the bitmap 356 provides a map 354 for the logical blocks in the erase block 328, in which the first two bits (10) reflect that the first logical block of the erase block 328 is valid and used, the second two bits (11) reflect that the second logical block is invalid, the third two bits (01) reflect that the third logical block is pre-allocated, and so on and so forth.

In some embodiments where logical blocks are compressed, two or more of the compressed logical blocks may be stored in the same physical page. For instance, if three logical blocks are stored in the same physical page of payload, then 6 bits of the log bitmap correspond to one physical page while corresponding to three logical blocks. Thus, the bitmap describes states of logical blocks, whether stored one per page or two or more per page. In some cases, all logical blocks of an erase block may have a pre-allocated state (reservation only), in which case the log may not require a payload.

As discussed in further detail below, the storage logic 104, when performing various operations, such as but not limited to, garbage collection, data migration, etc., can efficiently process erase block-based metadata structures (e.g., PEB or LEB-based block bitmaps) to determine the logical block states. As a further example, a garbage collection operation implemented by storage logic 104 may clean the logical blocks of the erase block, and may reference the bitmap to determine the states of the logical blocks to perform these actions.

An erase block (e.g., PEB, LEB, etc.) (also simply referred to herein as a block) may store one or more bitmaps mapping the states of the logical blocks comprising the PEB. In LFS embodiments, the storage logic 104 may store data as a sequence of logs. A log includes a payload portion and a metadata portion. The metadata portion may include a header, a footer, or another suitable appendage that can be referenced.

Figure 4A:
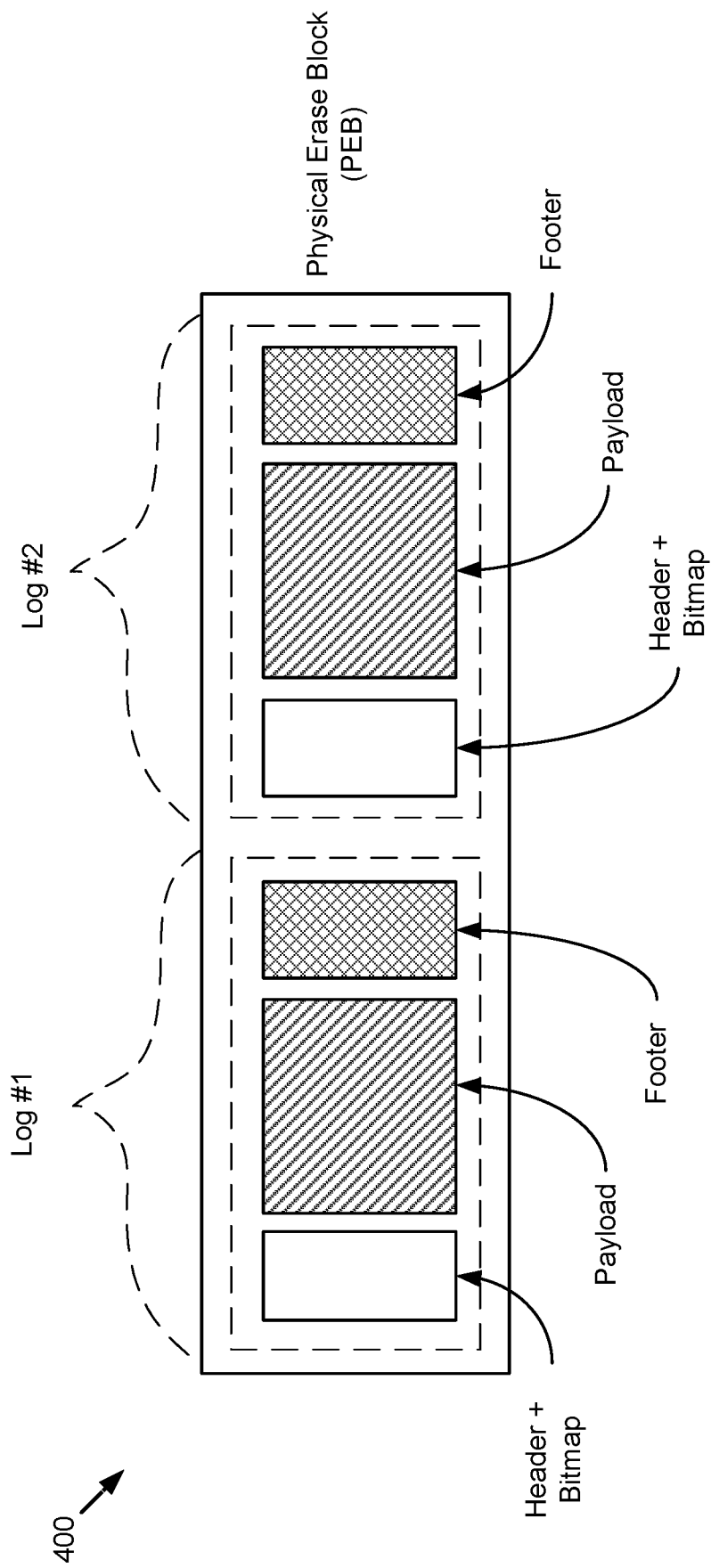
FIG. 4A is a diagram of example logs for a physical erase block.

FIG. 4A is a diagram of example logs for a PEB 400. In the depicted example, the physical erase block stores two logs, log #1 and log #2. Each of these logs includes a header, a payload, and a footer. The payload may include one or more logical blocks usable to store data. For example, the logical blocks of the payload may store newly added data. Among potentially other data, the header and footer may include information about the data stored in the log, such as in the payload, and/or other information usable for storage and maintenance of the data. For instance, in the depicted example, the header includes the log bitmap mapping/describing the respective logical block states to the logical blocks comprising a payload. While in the depicted example, the header includes the bitmap, it should be understood that the bitmap for each log may be stored in the header, footer, or any other segmentation that is suitable.

In some embodiments, the PEBs described herein may comprise a sequence of clean physical pages. The storage logic 104 can write data into each clean physical page once, before having to clean the pages of the erase block for a subsequent write operation. As such, when writing log(s) to the physical pages of a PEB, the storage logic 104 may prepare the entire log(s) into memory, and then to write the entire log(s) into the requisite clean physical pages of the PEB. The log(s) then remain in their originally written state until the pages of the PEB are erased, and now clean pages can be used for further write operations. In some embodiments, valid data is moved to other locations before the erase/cleaning operations. It should be understood, however, that in some embodiments, other existing or future memory devices may have erase blocks comprising portions that can be updated without the above PEB erasure limitations, and the methods, acts, and functionality described herein may be suitable for use therein.

By way of example and not limitation, consider that log #1 contains logical block #1 (bitmap of log #1 marks this block as valid). If the storage logic 104 determines that an update to the data of logical block #1 is needed, then the storage logic 104 can determine the state of the rest of the PEB's pages range, and then perform an update operation based on the pages state. In other words, the pages range state may reflect if pages are clean or unclean in the range, and the storage logic 104 may perform the update operation differently based on the outcome. For instance, in the case where the PEB has clean pages, then the storage logic 104 may generate log #2 that includes the new state of the logical block #1 (bitmap of log #2 still marks logical block #1 as valid). In the case where there are no or insufficient clean pages in the PEB to accommodate the log, the storage logic 104 may store the updated block into another PEB.

Figure 4B:
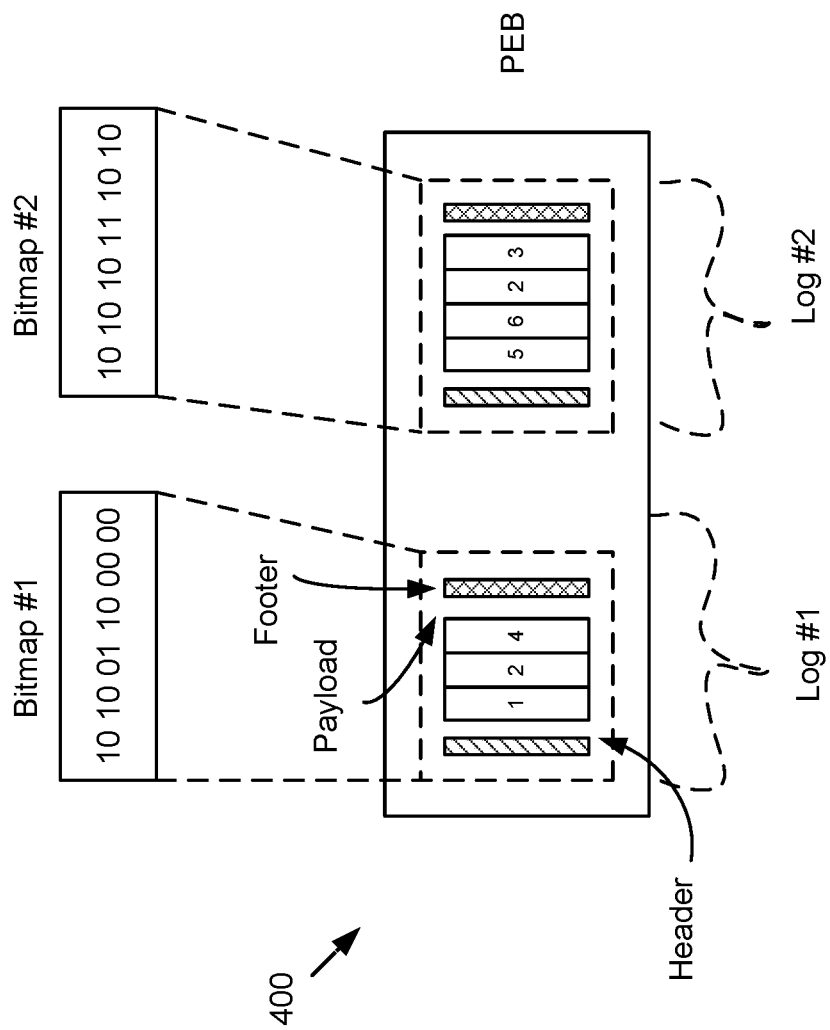
FIG. 4B is a further diagram of example logs for the physical erase block.

FIG. 4B is a further diagram of for the PEB 400. As shown, log #1 and log #2 may each include a corresponding version of the bitmap (e.g., bitmap #1, and bitmap #2). As discussed above, the bitmaps may be stored in the metadata portion of the logs, such as the header or/and the footer. In the illustrated example, bitmap #1 describes logical blocks #1, #2, and #4 as valid, logical block #3 as pre-allocated, and logical blocks #5 and #6 as free. Bitmap #2 describes logical block #4 as invalid and rest of blocks (#1, #2, #3, #5, and #6) as valid. By way of further example, since the states of logical blocks #1 and #2 remained valid between logs #1 and #2, the payload of log #2 may omit the logical blocks, while the bitmap #2 includes the actual (more recent) states of the logical blocks #1 and #2. However, logical block #3 changed from a pre-allocated state to a valid state, so it is included in log #2. Logical block #4 is invalid (e.g., because this block may have been truncated or moved into another PEB, etc.) so it may be omitted from the payload of log #2 but its state is included in the log bitmap #2. Logical blocks #5 and #6 are included in log #2 payload because their states changed from free in log #1 to valid in log #2.

In some embodiments, a portion of the pages forming a log may be apportioned for storing metadata. To account for this, the storage logic 104 may track the physical pages used by a log in a PEB with a counter. For instance, each log could store a metadata: a counter of physical pages in the log; a counter of metadata pages in the log (header+footer); and the log bitmap, and the storage logic could use the metadata to determine which pages and/or logical blocks comprise the payload and store user data.

The log bitmaps described herein provide a number of advantages in a LFS scenario, including, but not limited to, allowing for erasure from another point of view, allowing logical blocks and/or physical blocks to be processed separately and/or selectively (e.g., by the garbage collector), allowing multiple processing threads to be used, each of which can manipulate data in a PEB using an independent bitmap for that PEB, etc.

Figure 5:
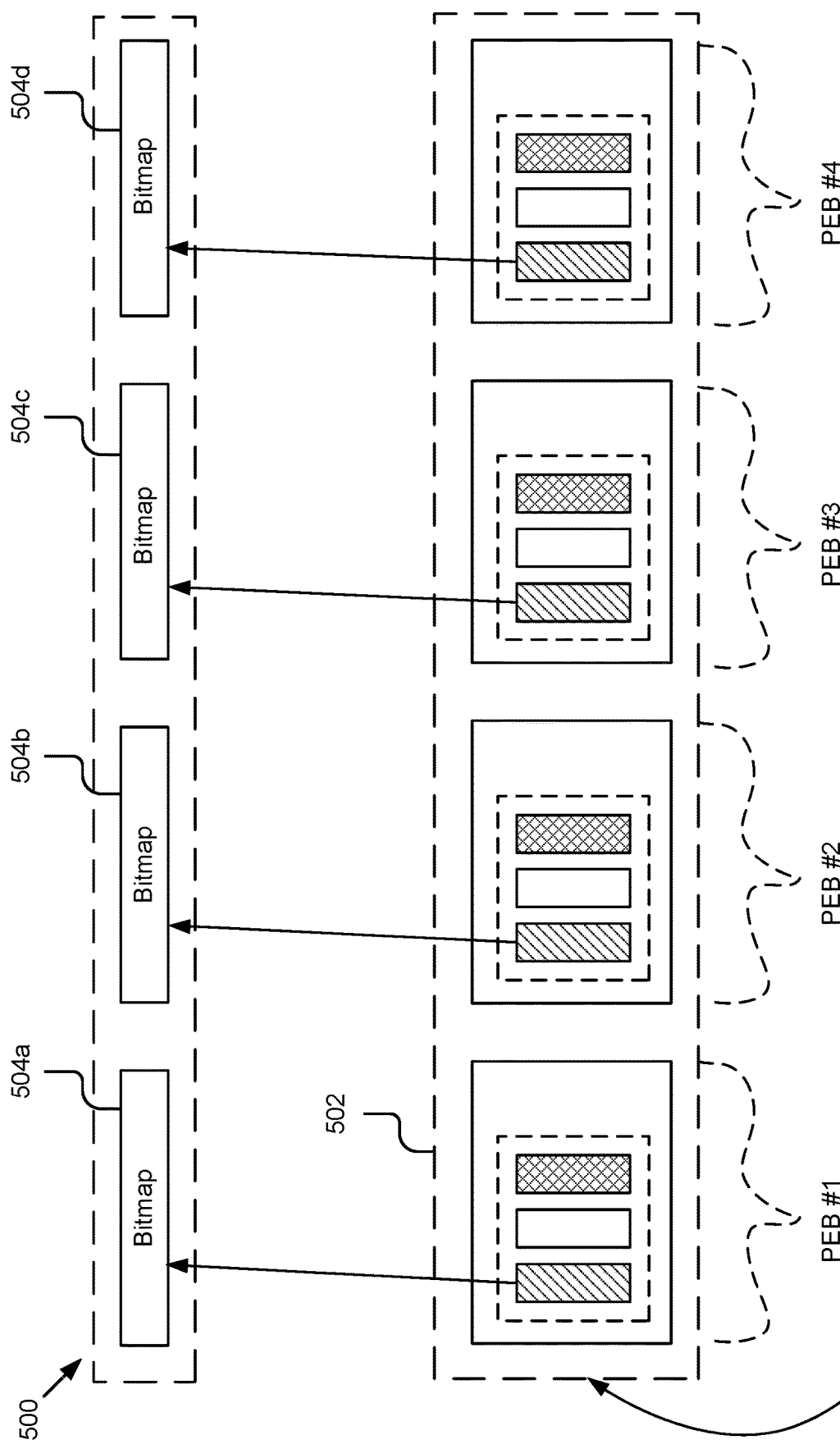
FIG. 5 is a diagram of an example segment block bitmap.

FIG. 5 is a diagram of an example segment block bitmap 500, which is aggregated from a plurality of bitmaps stored across one or more PEBs. The storage logic 104 may embody an LFS using a segment 500 as a base item for free space allocation and garbage collection. In some embodiments, a data volume may include one or more segments. For instance, in a typical example, the data volume may include numerous segments and/or PEBs.

In the depicted example, four PEBs (PEB #1, PEB #2, PEB #3, and PEB #4) form a segment. PEB #1, PEB #2, PEB #3, and PEB #4 each includes a log and a corresponding log bitmap. The storage logic 104 may retrieve the bitmap from the metadata of the log stored in each PEB (e.g., bitmap 504a from a log of PEB #1, bitmap 504b from a log of PEB #2, bitmap 504c from a log of PEB #3, bitmap 504d from a log of PEB #4, etc.) and combine them as an aggregated, segment block bitmap. While, in this example, a bitmap from four different PEBs is aggregated, the storage logic 104 may aggregate bitmaps corresponding to logs from any number of PEBs and in any suitable order.

The segment bitmap architecture provides a number of advantages including providing flexible, independent and efficient log bitmaps modification and storing on a file system volume, and allowing the storage logic 104 to process multiple channels independently. For instance, in some SSD embodiments, the SSD may include a multiplicity of NAND dies (e.g., hundreds, etc.). Each die may be configured to execute program/erase operations independently. Internally, the SSD may join dies into groups, and each group could be accessed by independent communication channel. In the case where a segment includes a combination of PEBs from different groups, then each PEB of that segment could advantageously be communicated with via an independent communication channel. For instance, an operation on the different PEBs of the same segment may be performed simultaneously in parallel, instead of placing all request for the same segment into one queue of one communication channel.

Figure 6A:
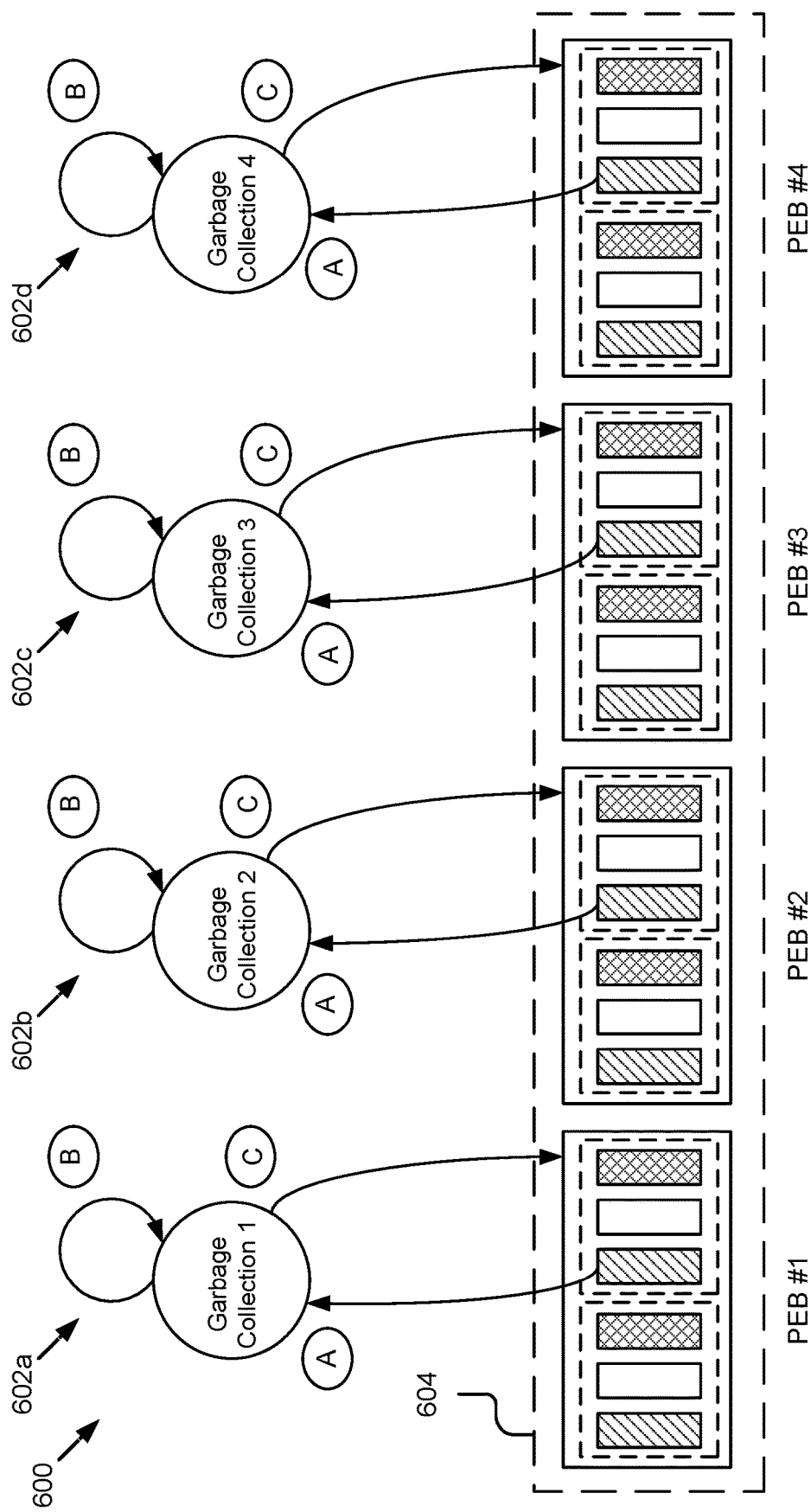
FIG. 6A is a diagram of example concurrent garbage collection for physical erase blocks of a segment.

FIG. 6A is a diagram of example concurrent garbage collection architecture 600 for PEBs of a segment 604. As discussed above, using the segment bitmap architecture comprised of PEB-based block bitmaps, the storage logic 104 can process independent physical blocks (e.g., NAND erase blocks) inside of a segment. With respect to garbage collection, using this architecture, the storage logic 104 can process a segment's PEBs concurrently using multiple concurrent threads, such as threads 602a, 602b, 602c, and 602d depicted in FIG. 6A.

Figure 6B:
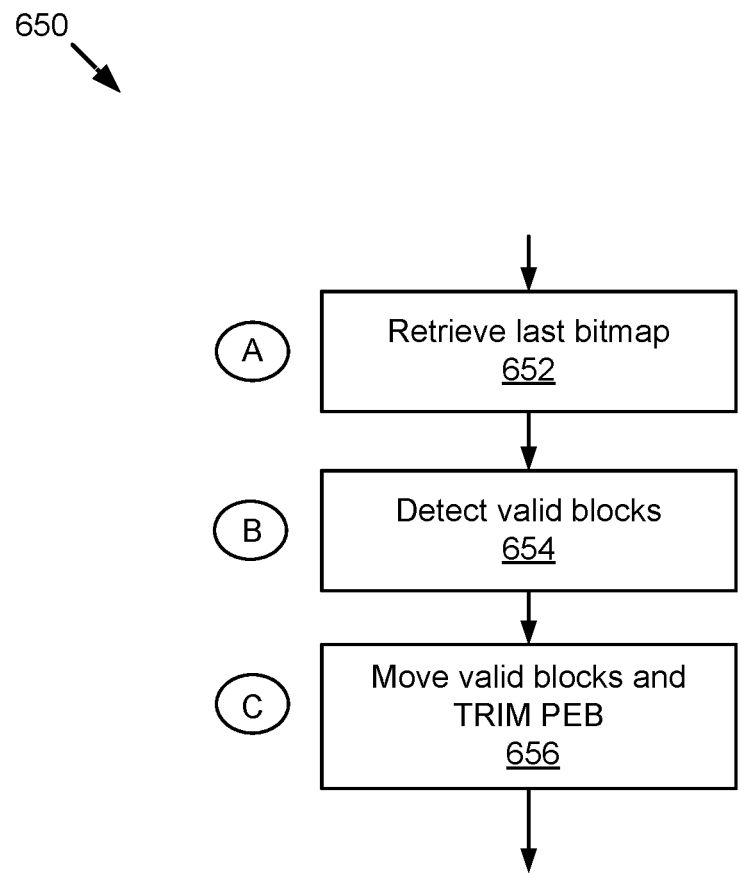
FIG. 6B is a diagram of an example method for moving blocks.

A garbage collection thread may execute the method 650 depicted in FIG. 6B. The method 650 may include a set of operations, such as those referenced using A, B, C, which respectively correspond to blocks 652, 654, and 656. In block 652, the storage logic 104 can retrieve the last log bitmap from the last log of the erase block (e.g., from the header, footer, etc., of the log). This advantageously allows the log bitmap to be quickly and efficiently found and retrieved from the erase block. In block 654, the storage logic 104 can detect the valid logical blocks using the log bitmap. The log bitmap is an advantageously compact and efficient metadata structure, which in turn allows for fast and efficient logical block state detection by the storage logic 104. In block 656, the storage logic 104 can move the data from the logical blocks detected as valid into another (e.g., clean) erase block. In some embodiments, the metadata portion(s) (e.g., header, footer, etc.) may store location metadata including information about the last actual location(s) of the logical block(s), which can be used to identify the location(s) of the so data from those locations can be moved. In some file system embodiments, the storage logic 104 may issue a TRIM command for an invalidated erase block, which may indicate to the storage device that the erase block no longer contains valid data and can be cleaned. In some storage device embodiments, the storage logic 104 may perform a foreground erase operation. Other variations are also possible and contemplated.

Figure 7:
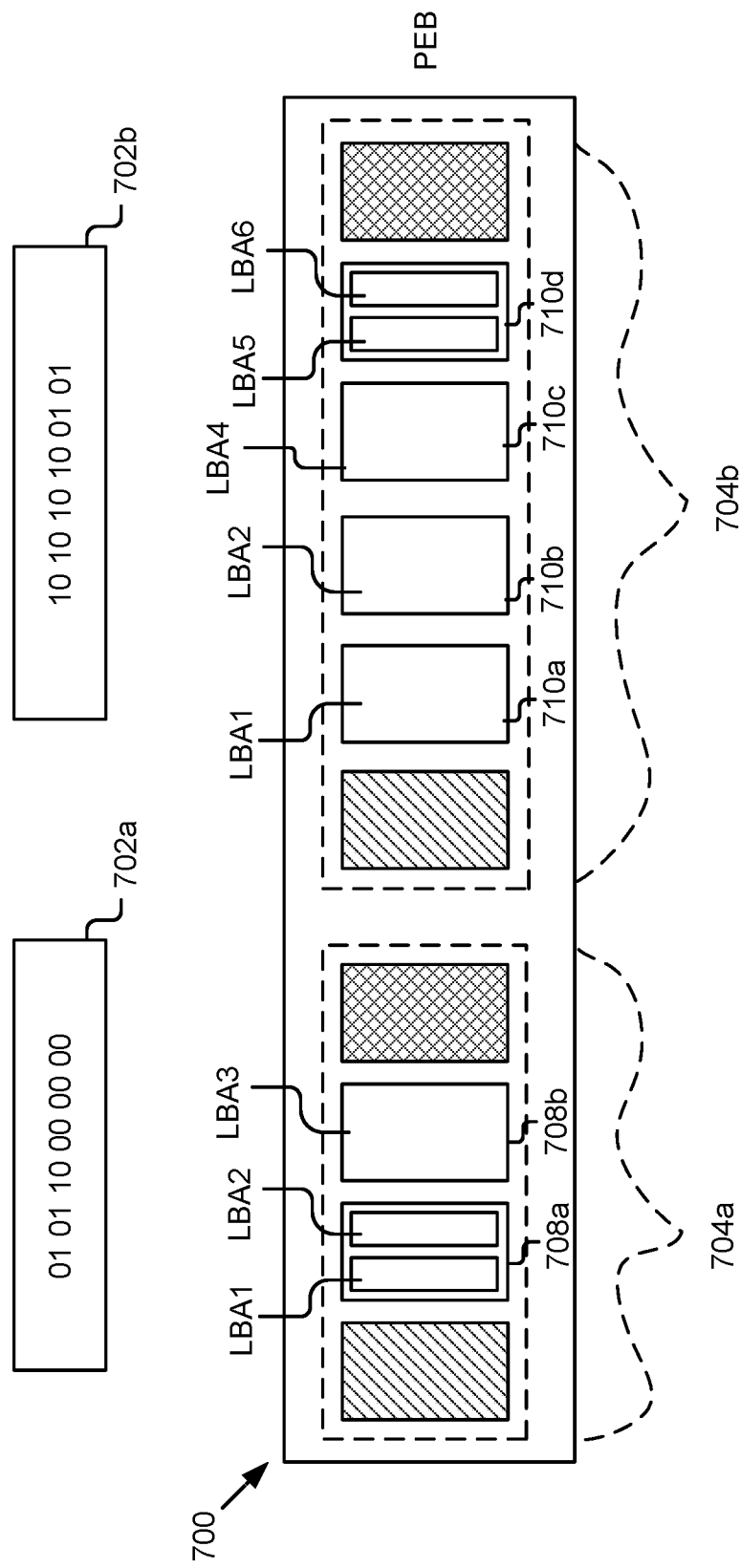
FIG. 7 is a diagram of an example PEB having pre-allocated states.

FIG. 7 is a diagram of an example PEB 700 having pre-allocated states. In some embodiments, the storage logic 104 may perform data compression (e.g., block compression, delta-compression, etc.), in which the storage logic 104 compresses logical blocks (also called addressable logical blocks, LBAs, etc.) and store more than one in a given physical page of the payload. The illustrated PEB includes two logs, 704a and 704b. Each log 704a, 704, etc., stores a corresponding version/state of a bitmap. For example, corresponding log bitmaps 702a and 702b may be stored in metadata portions of the logs 704a and 704b, as discussed elsewhere herein. The storage logic 104 may pre-allocate logical blocks for storage of compressed data in those portions. The size of the compressed logical blocks may be determined by the storage logic 104, and/or the number of compressed logical blocks to apportion to a given page (e.g., that can be stored in a given page).

By way of example, with reference to log 704a, two portions, LBA1 and LBA2, of page 708a may be pre-allocated and represent two compressed logical blocks, and a portion, LBA3, may be stored in page 708b and may have a valid state, as reflected in the bitmap 702a. LBA4, LBA5, and LBA6 are unallocated and are not represented in log 704a. Further, with reference to log 704b, the states of LBA1 and LBA2 in log 704b now have valid states as reflected by the bitmap 702b, and are stored in separate pages 710a and 710b. In some non-limiting cases, due to the state of LBA1 and LBA2 being updated and that efficient compression of LBA1 and LBA2 was unattainable, the LBAs may be each be stored in a separate physical page). Relative to log 704a, the state of LBA4 (which is stored in page 710c) has changed from an unallocated state to a valid state in log 704b, and LBA5 and LBA6 have changed from unallocated states to pre-allocated states, and these logical blocks are stored in page 710d.

A novel attribute of the log-structured storage technology is the capability of storing snapshots of previous logical block states for old logs. The snapshots can provide a reliable mechanism for storing and recovering log metadata. Since each log can store a bitmap reflecting the actual state of the erase block's logical blocks for certain timestamp(s), the storage logic 104 is executable to retrieve a prior log and use it to recover from a data corruption event. For instance, if the storage logic 104 (e.g., the file system driver) is unable to read data or metadata (e.g., unrecovered read error) from a log, or determines that the checksum of data or metadata from a log is incorrect, the storage logic 104 determines that the data or metadata is corrupt and can execute a rollback operation. For example, the storage logic 104, responsive to determining the corruption, can retrieve the latest historical snapshot of the bitmap and use that to determine the prior state(s) of the logical block(s). Further, file consistency utilities (e.g., fsck) may utilize the snapshots as the latest valid state to perform file system corrections, such as moving the entire contents of the PEB(s) and/or LEB(s) to other valid PEB(s) and/or LEB(s).

Figure 8:
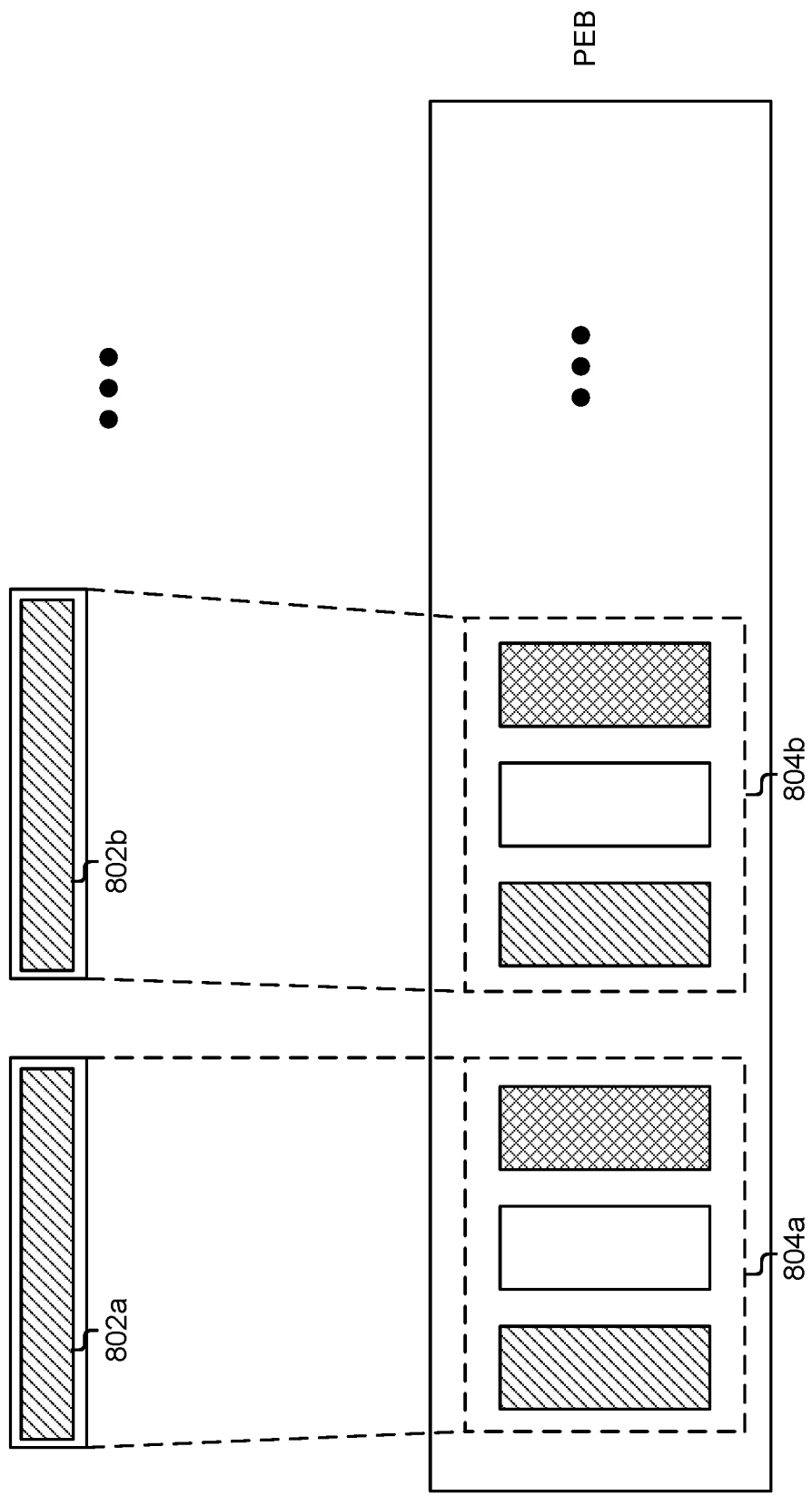
FIG. 8 is a diagram of example log bitmap snapshots.

FIG. 8 is a diagram of example log bitmap snapshots. As shown, a PEB may include one or more logs (804a, 804b, . . . ). The logs (804a, 804b, . . . ) respectively include corresponding bitmaps (802a, 802b, . . . ). Each bitmap (802a, 802b, etc.) shows the state of the erase block's logical blocks for a particular timestamp. These bitmaps (802a, 802b, etc.), which have different timestamps, reflect a sequence of snapshots over time, where each snapshot shows the states of the logical blocks of the erase block for that particular timestamp.

Figure 9:
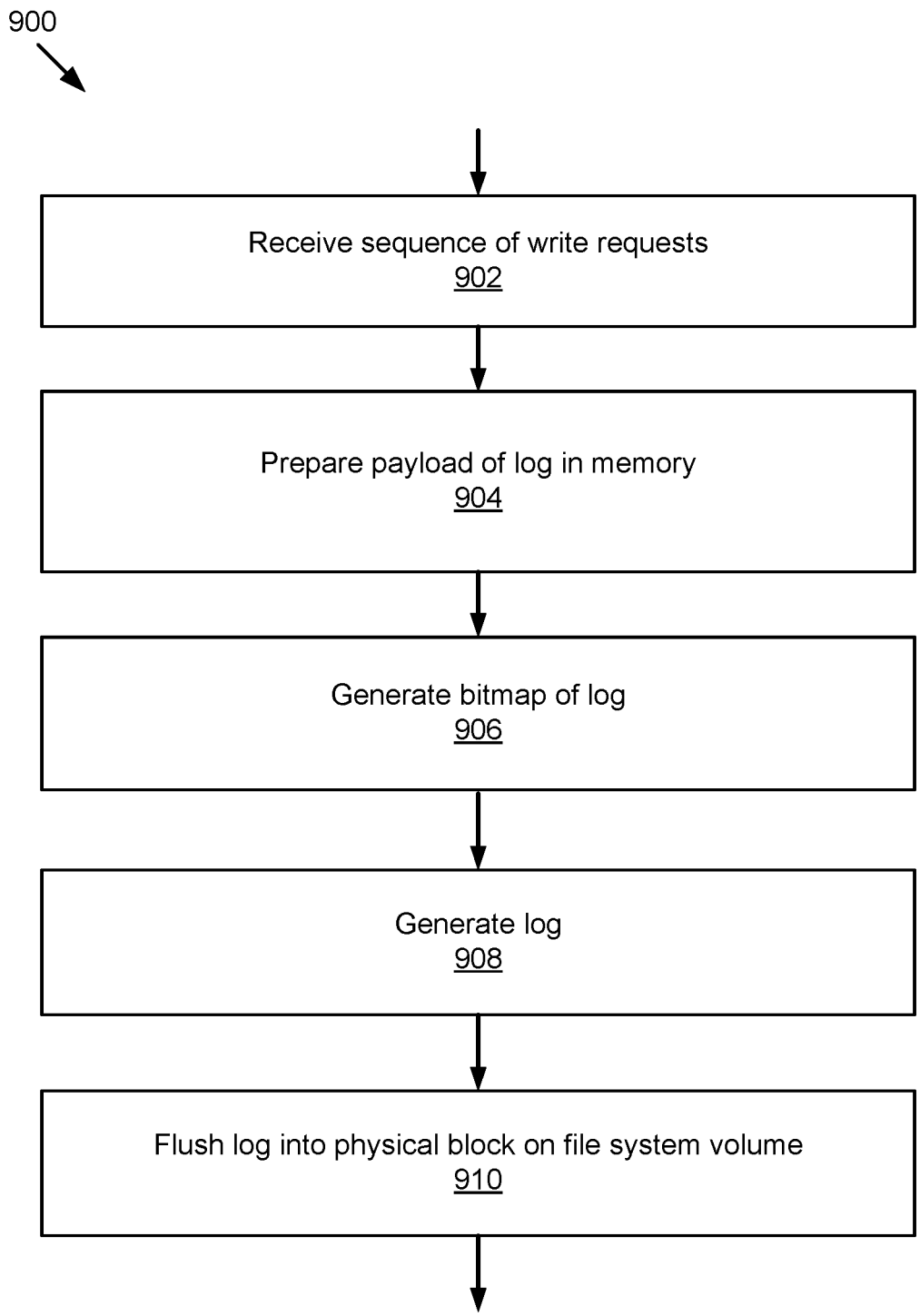
FIG. 9 is a flowchart of an example method for generating and storing a log including a log bitmap.

FIG. 9 is a flowchart of an example method 900 for generating and storing a log including a log bitmap. In block 902, the storage logic 104 may receive a sequence of write requests. In block 904, the storage logic 104 may prepare a payload of a log in memory. In block 906, the storage logic 104 may generate a bitmap for the log indicating the states of the logical blocks of the (to be written to) erase block. In block 908, the storage logic 104 may generate the log, for instance, by combining the metadata portion and the payload portion (e.g., header, payload, and the footer), and then in block 910, may store the log in the erase block of the non-transitory storage device (e.g., flush the log into the erase block on the file system volume).

In typical cases, a series of logs are written to an erase block over time, as described elsewhere herein. In some embodiments, the storage logic 104 is configured to determine whether an erase block has clean pages to which to write logs. For instance, continuing the above method description, the storage logic 104 may receive a second sequence of write requests, and responsive thereto, may determine that a sufficient number of clean pages are available in the erase block to accommodate a second log for the second sequence. Based on the determination, the storage logic 140 can generate a second log including a second log payload and a second log bitmap, and store the second log in clean pages of the erase block.

It should be understood that the various operations of the methods described herein may be expanded upon, combined, extended, etc., all of which are encompassed by the present disclosure. Further, it should be understood that, in many instances, the methods may be iterated more than one time (e.g., numerous times). Additionally, the usage of the terms first, second, etc., in various places in this disclosure does not necessarily imply a specific order or rank, and is used in some cases to help the reader discern between various objects, items, elements, etc.

To ease description, some elements of the technology, such as the described system and/or the methods, are referred to using the labels first, second, third, etc. These labels are intended to help to distinguish the elements but do not necessarily imply any particular order or ranking unless indicated explicitly or contextually otherwise.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of a hardware implementation, a software implementation, or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system comprising:
a non-transitory memory;
a non-transitory storage device; and
a storage logic communicatively coupled to the non-transitory storage device and the non-transitory memory, the storage logic executable to perform operations comprising:
preparing a first log payload in the non-transitory memory;
generating a first log bitmap describing a set of states for a set of logical blocks of an erase block of the non-transitory storage device, wherein a state described in the first log bitmap indicates whether the erase block requires an erase operation before a corresponding logical block of the erase block can be written to;
generating a first log including the first log bitmap and the first log payload;
storing the first log in the erase block of the non-transitory storage device;
receiving a write request; and
responsive to the write request,
identifying a logical block of the set of logical blocks having a first state in the first log bitmap;
adding the identified logical block to a second log payload of a second log to store data associated with the write request;
responsive to the write request and the identified logical block being added to the second log payload of the second log, generating a second log bitmap for the second log to include a second state of the identified logical block that is based on the first state; and
storing the second log including the second log bitmap and the second log payload in the erase block of the non-transitory storage device,
wherein the first log and the second log are distinct from each other, and the first log and the second log are stored in the erase block of the non-transitory storage device.

2. The system of claim 1, wherein:
the first log bitmap represents each state of the set of states using at least two bits; and
each state is one of a free state, a pre-allocated state, a valid state, and an invalid state.

3. The system of claim 1, wherein the storage logic comprises at least a portion of a log-structured file system.

4. The system of claim 1, wherein the operations further comprise:
receiving a first sequence of write requests; and
generating the first log responsive to the first sequence of write requests being received.

5. The system of claim 4, wherein the operations further comprise:
receiving a second sequence of write requests;
determining that a sufficient number of clean pages are available in the erase block to accommodate a third log for the second sequence of write requests;
generating the third log including a third log payload and a third log bitmap; and
storing the third log in the erase block.

6. The system of claim 5, wherein:
generating the first log bitmap includes marking a state of a particular logical block of the set of logical blocks of the erase block as pre-allocated; and generating the third log includes generating the third log bitmap that marks the state of the particular logical block as valid.

7. The system of claim 5, wherein:
the first log bitmap is associated with a first timestamp;
the third log bitmap is associated with a second timestamp that is later than the first timestamp; and
the operations further comprise:
  determining that a second metadata portion of the third log storing the third log bitmap is corrupt;
  retrieving the first log bitmap from a first metadata portion of the first log; and
  executing a data rollback operation using the first log bitmap.

8. The system of claim 1, wherein:
the first log bitmap marks two or more logical blocks of the set of logical blocks as pre-allocated;
the two or more logical blocks are compressed logical blocks; and
the two or more logical blocks are stored in a same physical page of the erase block.

9. The system of claim 1, wherein the first log includes a metadata portion storing the first log bitmap, a counter of physical pages in the first log, and a counter of metadata pages in the first log.

10. A computer-implemented method comprising:
preparing a first log payload in a non-transitory memory;
generating a first log bitmap describing a set of states for a set of logical blocks of an erase block of a non-transitory storage device, wherein a state described in the first log bitmap indicates whether the erase block requires an erase operation before a corresponding logical block of the erase block can be written to;
generating a first log including the first log bitmap and the first log payload;
storing the first log in the erase block of the non-transitory storage device;
receiving a write request; and
  responsive to the write request, identifying a logical block of the set of logical blocks having a first state in the first log bitmap;
  adding the identified logical block to a second log payload of a second log to store data associated with the write request;
  responsive to the write request and the identified logical block being added to the second log payload of the second log, generating a second log bitmap for the second log to include a second state of the identified logical block that is based on the first state; and
  storing the second log including the second log bitmap and the second log payload in the erase block of the non-transitory storage device, wherein the first log and the second log are distinct from each other, and the first log and the second log are stored in the erase block of the non-transitory storage device.

11. The computer-implemented method of claim 10, wherein:
the first log bitmap represents each state of the set of states using at least two bits; and
each state is one of a free state, a pre-allocated state, a valid state, and an invalid state.

12. The computer-implemented method of claim 10, further comprising:
receiving a first sequence of write requests; and
generating the first log responsive to the first sequence of write requests being received.

13. The computer-implemented method of claim 12, further comprising:
receiving a second sequence of write requests;
determining that a sufficient number of clean pages are available in the erase block to accommodate a third log for the second sequence of write requests;
generating the third log including a third log payload and a third log bitmap; and
storing the third log in the erase block.

14. The computer-implemented method of claim 13, wherein:
generating the first log bitmap includes marking a state of a particular logical block of the set of logical blocks of the erase block as pre-allocated; and
generating the third log includes generating the third log bitmap that marks the state of the particular logical block as valid.

15. The computer-implemented method of claim 13, wherein:
the first log bitmap is associated with a first timestamp;
the third log bitmap is associated with a second timestamp that is later than the first timestamp; and
the method further comprises:
  determining that a second metadata portion of the third log storing the third log bitmap is corrupt;
  retrieving the first log bitmap from a first metadata portion of the first log; and
  executing a data rollback operation using the first log bitmap.

16. The computer-implemented method of claim 10, wherein:
the first log bitmap marks two or more logical blocks of the set of logical blocks are pre-allocated;
the two or more logical blocks are compressed logical blocks; and
the two or more logical blocks are stored in a same physical page of the erase block.

17. The computer-implemented method of claim 10, wherein the first log includes a metadata portion storing the first log bitmap, a counter of physical pages in the first log, and a counter of metadata pages in the first log.

18. A system comprising:
means for preparing a first log payload in a non-transitory memory;
means for generating a first log bitmap describing a set of states for a set of logical blocks of an erase block of a non-transitory storage device, wherein a state described in the first log bitmap indicates whether the erase block requires an erase operation before a corresponding logical block of the erase block can be written to;
means for generating a first log including the first log bitmap and the first log payload;
means for storing the first log in the erase block of the non-transitory storage device;
means for receiving a write request; and
responsive to the write request,
  means for identifying a logical block of the set of logical blocks having a first state in the first log bitmap;
  means for adding the identified logical block to a second log payload of a second log to store data associated with the write request;
  means for responsive to the write request and the identified logical block being added to the second log payload of the second log, generating a second log bitmap for the second log to include a second state of the identified logical block that is based on the first state; and means for storing the second log including the second log bitmap and the second log payload in the erase block of the non-transitory storage device, wherein the first log and the second log are distinct from each other, and the first log and the second log are stored in the erase block of the non-transitory storage device.

19. The system of claim 18, wherein:

the first log bitmap represents each state of the set of states using at least two bits; and each state is one of a free state, a pre-allocated state, a valid state, and an invalid state.

20. The system of claim 18, further comprising:

means for receiving a first sequence of write requests; and means for generating the first log responsive to the first sequence of write requests being received.

\* \* \* \* \*